United States Patent [19]
Blois et al.

[11] Patent Number: 6,018,543
[45] Date of Patent: Jan. 25, 2000

[54] NOISY CHANNEL AVOIDANCE METHOD IN A DIGITAL COMMUNICATION SYSTEM

[75] Inventors: Gary V. Blois, Towaco; Joseph M. Fine, West Caldwell, both of N.J.; Marvin A. Epstein, Monsey, N.Y.

[73] Assignee: ITT Manufacturing Enterprises, Inc., Wilmington, Del.

[21] Appl. No.: 08/861,604

[22] Filed: May 21, 1997

[51] Int. Cl.$^7$ .............................. H04B 15/00; H04B 1/26
[52] U.S. Cl. ....................................... 375/202; 455/199.1
[58] Field of Search ..................................... 375/202, 200, 375/201, 346, 224; 455/199.1, 179.1

[56] References Cited

U.S. PATENT DOCUMENTS

5,319,573   6/1994   Corleto et al. ........................... 375/346
5,574,750  11/1996   Peponides et al. ..................... 375/224

*Primary Examiner*—Stephen Chin
*Assistant Examiner*—Albert Park

[57] ABSTRACT

There is disclosed in a frequency hopping digital communication network having a multimode radio transmitter for transmitting a data signal and a multimode radio receiver tuned for receiving the same, the multimode transmitter and receiver operable in a first standard mode and a second enhanced mode, each mode having a late-net acquisition library period and an in-net acquisition library period, a method for obtaining a non-noisy frequency channel over which to receive the data signal transmitted across the radio network. The method comprises the steps of successively averaging signal samples received over a particular frequency channel and time interval corresponding to the receiver mode and library period to determine the noise level of the particular reception frequency channel. The averaged signal samples are then compared to a predetermined noise threshold to determine whether the frequency channel is noisy. If the frequency channel is determined to be noisy, the receiver is tuned to a new reception frequency channel, the new frequency channel being selectable from a group of permissible frequency channels and responsive to the receiver mode and library period and in a predetermined sequence. The steps are repeated until the noise threshold is no longer exceeded.

41 Claims, 9 Drawing Sheets

FLOWCHART OF NOISY CHANNEL AVOIDANCE PROCESS

| | |
|---|---|
| SC & FH (PT/CT) | STANDARD DATA MODES (SDM) 600/1200/2400/4800/9600/16000 BPS RATES |
| SC & FH (PT/CT) | ENHANCED DATA MODES (EDM) 1200/2400/4800/9600 BPS AND PACKET |
| SC-PT | ANALOG FM VOICE |
| SC/FH CT | CVSD 16 KBPS VOICE |
| SC & FH (PT/CT) | RADIO RE-TRANSMIT (ALL VOICE, SDM/EDM DATA RATES AND MIXED MODES) |
| SC & FH (PT/CT) | REMOTE RADIO (2-WIRE) BOTH SINCGARS RADIO CONTROL UNIT (SRCU) AND RT (ALL VOICE AND SDM/EDM AND PACKET DATA RATES |
| SC (PT/CT) | VOICE SCAN |
| GPS SITUATION AWARENESS (SA) | |
| PACKET SWITCHING NETWORKING WITH CSMA PROTOCOL | |
| HOMING | |

FIG. 1A

RADIO MODES

FLOWCHART OF NOISY CHANNEL AVOIDANCE PROCESS

EDM IN-NET LIBRARY PROFILE LIST

| SDM | 30 | FREQUENCY CHANNEL | A | MOD CODE | A' |
|---|---|---|---|---|---|
| LATE-NET LIBRARY PERIOD | 45 | ● | B | ● | B' |
| "N" PROFILE | 15 | ● | C | ● | C' |

| SDM LATE-NET | 30 | FREQUENCY CHANNEL | NEW | MOD CODE | NEW |
|---|---|---|---|---|---|
| LIBRARY PERIOD "N+60" | 45 | | A | | A' |
| PROFILE | 15 | | B | | B' |

| N+120 | FREQUENCY CHANNEL | MOD CODE |
|---|---|---|
| N+180 | ● | ● |
| ● | ● | ● |
| ● | ● | ● |
| ● | ● | ● |
| ● | ● | ● |

SDM LATE-NET LIBRARY PROFILE LIST

FIG.6

| EDM LATE-NET LIBRARY PERIOD "N" PROFILE | FREQUENCY CHANNEL   A<br>● B<br>● C | MOD CODE   A'<br>● B'<br>● C' |
|---|---|---|

| EDM LATE-NET LIBRARY PERIOD "N+120" PROFILE | FREQUENCY CHANNEL   NEW<br>● A<br>● B | MOD CODE   NEW<br>A'<br>B' |
|---|---|---|

| N+240<br>N+360<br>●<br>●<br>● | FREQUENCY CHANNEL<br>●<br>●<br>●<br>●<br>● | MOD CODE<br>●<br>●<br>●<br>●<br>● |
|---|---|---|

EDM LATE-NET LIBRARY PROFILE LIST

FIG.7

NOISY CHANNEL AVOIDANCE METHOD IN A DIGITAL COMMUNICATION SYSTEM

FIELD OF THE INVENTION

The invention relates to digital communication systems, and more particularly, to a method and apparatus for determining the relative noise of a digital radio transmission channel and retuning the radio to a different channel to allow digital signal reception.

BACKGROUND OF THE INVENTION

The purpose of a digital communication system is to effectively transmit and receive information over a particular channel or communication medium. To that end, the performance of any communication system is ultimately determined (and often limited) by its ability to respond to the presence of noise in the system. Digital radios often have many modes for communicating with one another, and many methods of suppressing or limiting noise within a network, such as frequency hopping, bit and frame synchronization, and numerous modulation/demodulation and filtering techniques. The Single Channel Ground-Airborne Radio System (SINGCARS) digital radio is an example of a type of radio which employs these various modes and methods of communication. Radios employing these techniques are shown in commonly assigned, copending U.S. patent application Ser. No. 08/846,885 filed on May 1, 1997 by Pries, et al., entitled "Method and Apparatus for Voice Intranet Repeater and Range Extension", Ser. No. 08/857,990 filed on May 16, 1997 by Bertrand, et al., entitled "Radio Architecture for an Advanced Digital Radio in a Digital Communication System", Ser. No. 08/861,606 filed on May 22, 1997 by Epstein, et al., entitled "Radio Remote Interface for Modulating/Demodulating Data in a Digital Communication System", and Ser. No. 08/850,231, filed on May 2, 1997 by Epstein, et al., entitled "Frequency Hopping Synchronization and Tracking in a Digital Communication System". In frequency hopping signal transmission systems, a wideband signal is generated by hopping from one frequency to another over a large number of frequency choices. The frequencies used are chosen by a code similar to those used in direct sequence systems. For general background on spread spectrum systems, reference is made to a text entitled *Spread Spectrum Systems*, 2nd edition, by Robert C. Dixon and published by Wiley-Interscience, New York (1984).

Despite these various techniques and synchronization schemes, situations often occur wherein a particular communication channel is jammed or becomes so noisy that an information signal transmitted over that particular channel is unintelligible at the receiver. Alternatively, a receiver may detect the presence of noise over a noisy communication channel and mistake it for an information signal. This represents a major problem for almost any communication system, but is particularly troublesome for military applications and emergency situations, where constant communication and informational updates are vital to mission success. Under such conditions, the receiver must be tuned to a different channel in order to properly receive and decode the information signal transmitted. However, network protocols such as Carrier Sense Multiple Access (CSMA) which are used within the digital radio communication system require strict adherence to system timing requirements in order to acquire and receive an information signal within a particular time interval. Therefore, it is essential not only that a different, non-noisy channel be available over which to receive an information signal, but that selection and acquisition of that channel be attained within the time constraints of the particular network protocol and system requirements utilized by an application. Consequently, it is greatly desirable to obtain an improved method for determining if a particular frequency channel is noisy and, if so, to cycle to a clear or non-noisy channel within a permissible time interval so as to maintain network continuity.

SUMMARY OF THE INVENTION

It is an object of the present invention to provide in a frequency hopping digital communication network having a multimode radio transmitter for transmitting a data signal and a multimode radio receiver tuned for receiving the same, the multimode transmitter and receiver operable in a first standard mode and a second enhanced mode, each mode having a late-net acquisition library period and an in-net acquisition library period, a method for obtaining a non-noisy frequency channel over which to receive the data signal transmitted across the radio network, the method comprising the steps of: successively averaging signal samples received over a particular frequency channel and time interval corresponding to the receiver mode and library period to determine the noise level of the particular reception frequency channel; comparing the averaged signal samples to a predetermined noise threshold to determine whether the frequency channel is noisy; tuning the receiver to a new reception frequency channel, the new frequency channel selectable from a group of permissible frequency channels responsive to the receiver mode and library period and in a predetermined sequence, when the noise threshold is exceeded; and repeating the above steps until the noise threshold is not exceeded.

BRIEF DESCRIPTION OF THE DRAWINGS

The invention is to be explained in more detail below based on an embodiment, depicted in the following figures where.

DETAILED DESCRIPTION OF THE INVENTION

The present invention is directed to a noisy channel avoidance method which has application in almost any mobile radio device where noise may jam a particular communication channel, thereby interfering with a receiver's ability to receive a transmitted signal. This noisy channel avoidance process is especially useful in its application to a frequency hopping radio system such as the Single Channel Ground-Airborne Radio System (SINGCARS) Combat Net Radio (CNR), since a CNR employing the avoidance process of the present invention can receive a transmitted signal over a number of different frequency channels provided it has the same profile list of frequency channels and modulation codes as the transmitter. Accordingly, the noisy channel avoidance process of the present invention will be described in its application to a CNR.

Before going into detail explaining the nature of the invention the following should be understood. To permit communication between a transmitting radio source and a receiver radio or multiple receivers, the time difference or time differential between the transmitter radio and the receiver(s) must be within radio design limits. For this discussion, time is denoted as "time units". To this end, a "0" time unit denotes a 0 offset time unit (i.e. no offset) between the transmitter and receiver. A "−2" time unit denotes that the transmitter leads the receiver's time base by 2 time units, while a "+2" time unit denotes that the transmitter lags the receiver's time base by 2 time units. This logic follows for +/−4, +/−6 and so forth. A radio receiver wherein the present invention resides has a number of modes for acquiring a transmitter within a prescribed time period, including an In-Net mode and a Late-Net mode. The In-Net entry mode is the process of a receiver acquiring reception to a transmitter source provided the time differential between the transmitter and the receiver is bounded within the In-Net region. For In-Net Standard Data Mode (SDM), (operable to transceive voice data at a multiple bit rates), the region is defined up to and including +/−4 time units. For In-Net Enhanced Data Mode (EDM) (operable to transceive voice and packet data at multiple bit rates), the region is defined up to and including +/−6 time units. If the time differential exceeds the bounded region of the In-Net mode, then a Late-Net acquisition mode is invoked to permit communications. Late-Net is similar to In-Net except that it has a wider bounding. However, its resolution of time is lesser than In-Net. Accordingly, to permit communications to take place for a time differential exceeding the In-Net region, the acquisition process first implements Late-Net procedure to resolve the differential to within the In-Net region. Then the In-Net acquisition is invoked to resolve the ambiguity to "0" units of time, thereby permitting communication.

Figure 5:
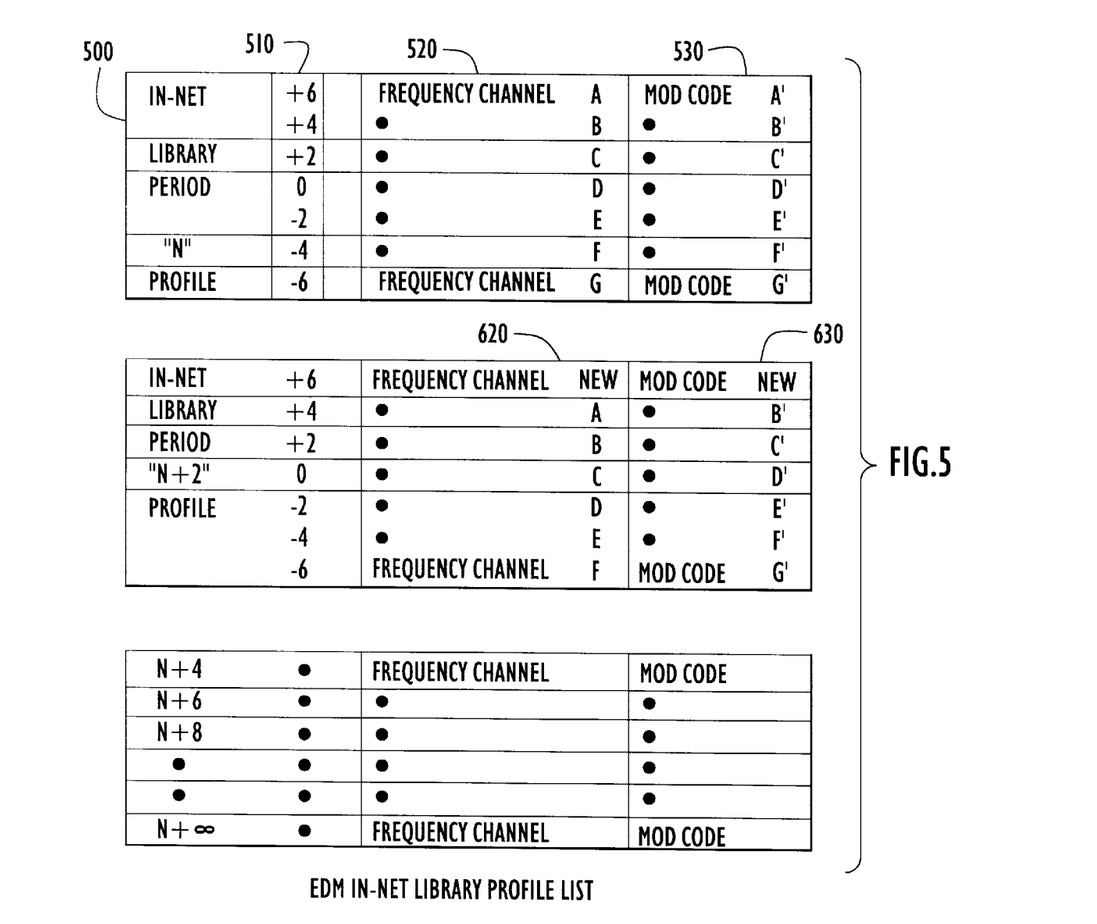
FIG. 5 is an exemplary diagram of an EDM In-Net Library Profile List.

The noisy channel avoidance process basically comprises sampling a set of channels on a profile list, determining if a particular channel is noisy or not, and using a channel that is not noisy to receive a transmitted signal. The process is invoked for each library period or interval of the particular mode of radio operation. As an example, FIG. 5 shows a diagram of an In-Net library period and profile list for determining the operation of the channel selection process. In Sub Figure A of FIG. 5, during the time period "N" referred to herein as In-Net library period N, a profile 500 comprising the association of time unit offsets 510 (i.e. 0, +2, −2, +4, −4, +6, −6), frequency channels 520 (A, B, C, ..., G) and modulation codes 530 (A1, B1, C1, ..., G1) is illustrated. After two (2) units of time have expired, a new In-Net library period N+2 profile is generated, as illustrated in Sub Figure B. This new profile differs from the profile of Sub Figure A by the creation of a "new" channel and modulation code (reference numerals 620 and 630), but retaining the previous six channels and codes in a "push down" stack manner. During the time interval of Library period N, those associated frequency channels and modulation codes are valid. So long as a receiver has the same profile list as a transmitter, it can acquire the transmitter, anywhere within the foresaid time bound (i.e. +/−6 time units). To reduce interference and spoofing, the In-Net library period profile changes every 2 time units as illustrated in Sub Figure C. Therefore, all participants in the communication network, must create a new profile in unison every two units of time. As will be described, the inventive noisy channel avoidance process enables the receiver to cycle through each of the valid frequencies associated with each offset time position so long as the particular library time interval has not expired, to obtain a non-noisy channel over which to receive a transmitted data signal.

Figure 1:
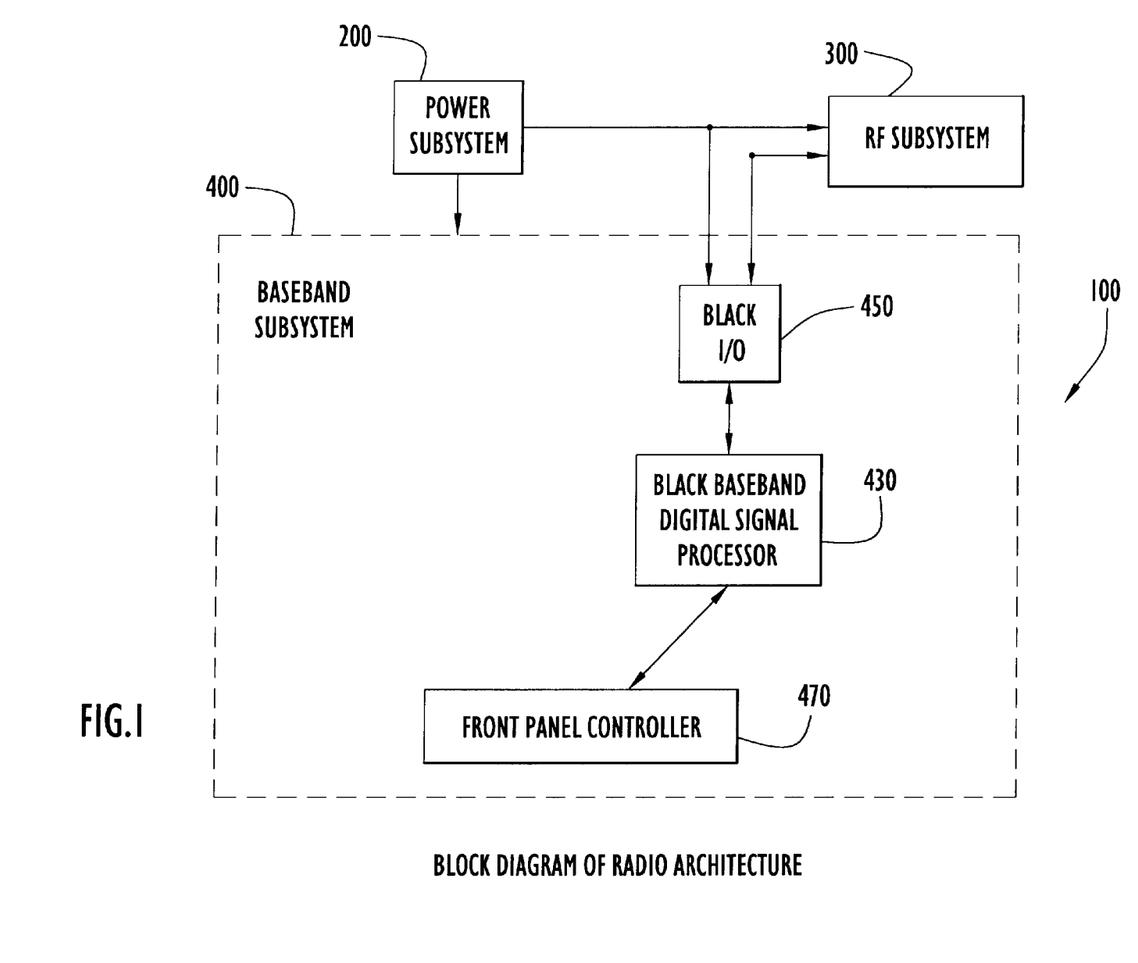
FIG. 1 is an exemplary diagram of the radio architecture of a radio transmitter/receiver wherein the present invention resides.
Figure 2:
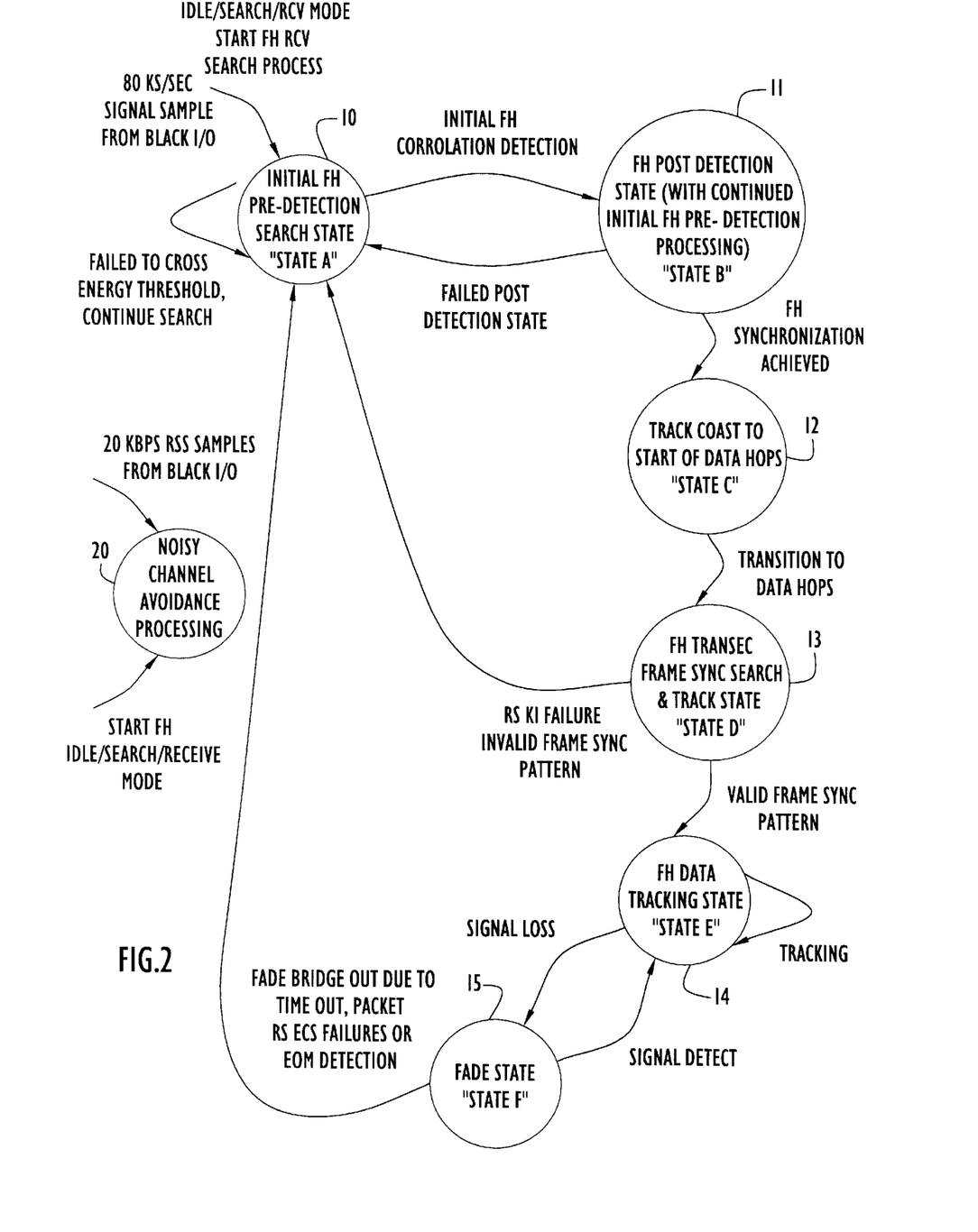
FIG. 2 is a diagram showing the concurrent operation of the pre and post-detection search processing and noisy channel avoidance processing.

A functional block diagram of the architecture wherein the present invention resides is illustrated in FIGS. 1 and 2. FIG. 1 describes a particular embodiment of the overall architecture utilized by the present invention, while FIG. 2 illustrates the Frequency Hopping (FH) search and acquisition process of detecting whether an information signal is present on a particular frequency channel concurrent with the noisy channel avoidance process of determining whether that particular search channel is noisy. Before describing the nature of the invention, a brief description of an embodiment of the radio architecture and the communication process wherein the present invention resides is warranted.

Figure 1A:
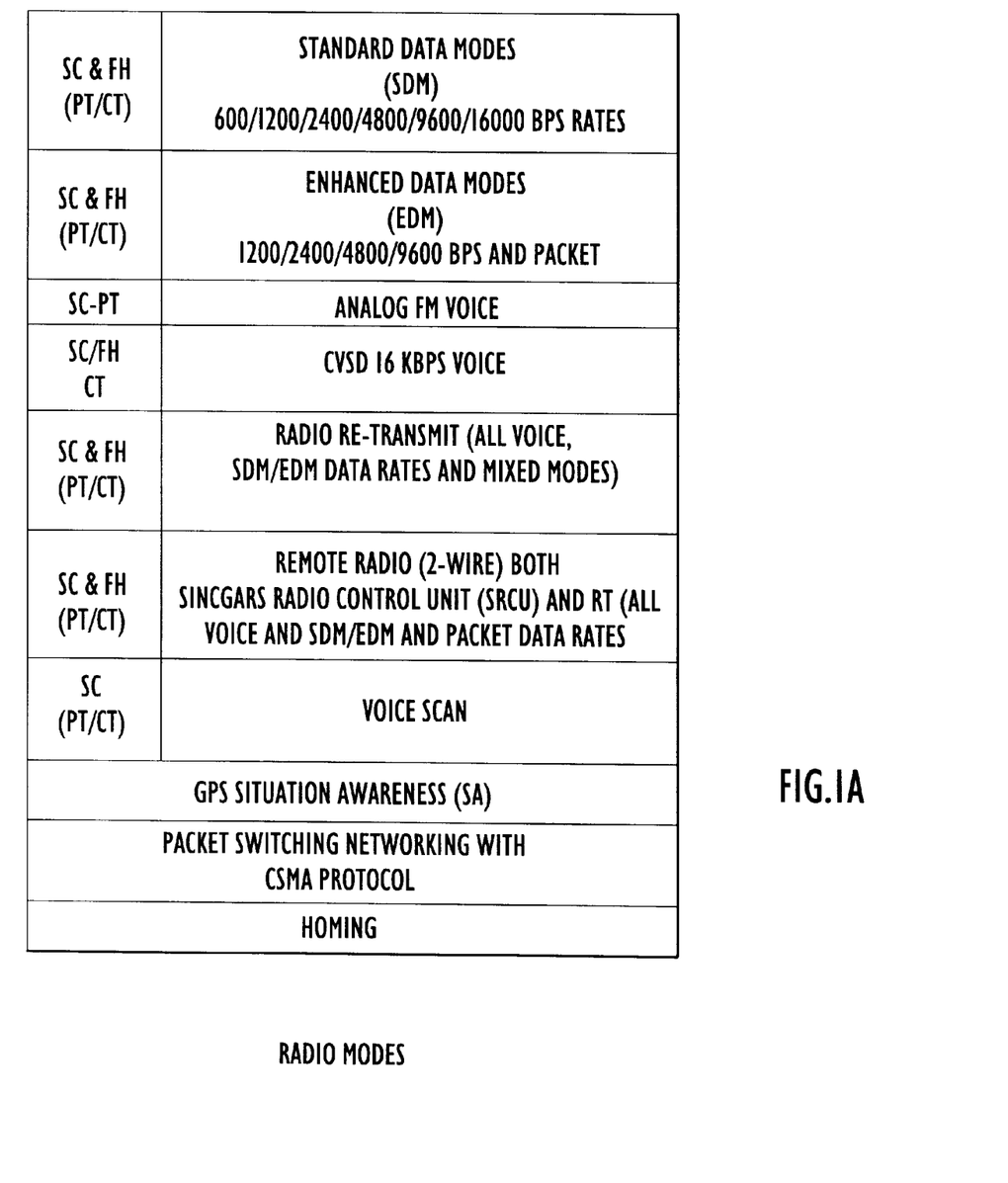
FIG. 1A is an exemplary diagram illustrating the various modes of operation of the radio transmitter/receiver.

Referring to FIGS. 1 and 1A, multimode radio 100 is operable in a variety of modes of operation. The modes of interest to the present invention include frequency hopping (FH) Standard Data Modes (SDM) operable to transceive voice data at a variety of bit rates and FH Enhanced Data Modes (EDM) operable to transceive voice and packet data at a variety of bit rates. Radio 100 includes a power subsystem 200, an RF subsystem 300 and a baseband subsystem 400. Power subsystem 200 develops all voltages required by the baseband 400 and RF 300 subsystems. Baseband subsystem 400 includes a front panel controller 470 and of particular interest to the present invention, a black baseband digital signal processor (BBP) 430 and black I/O circuitry 450. BBP 430 performs the primary radio functions of radio 100 including waveform processing, frame and bit synchronization, and frequency hop (FH) generation. Black I/O circuitry 450 operates in a transmit mode to receive data samples from BBP 430 and prepare the data for transmission to the RF subsystem. Of particular importance to the present invention, black I/O circuitry 450 operates in a receive mode to receive data from RF 300, digitize the data via A/D converters and send samples to BBP 430 for demodulation and processing. Black I/O circuitry 450 thus provides the interface between the digital radio baseband and the RF 300. BBP 430 also communicates control information to RF subsystem 300 through black I/O 450 to control and tune RF 300.

FIGS. 1 and 2 show that the noisy channel avoidance (NCA) processing of the present invention is activated when radio 100 and hence, BBP 430, is in the FH IDLE SEARCH/ RECEIVE state. Concurrent with this activation, initial FH pre-detection and post-detection search processing, as illustrated in FIG. 2 modules 10 and 11, is also being performed to determine if a phasing signal is present in the noisy transmission medium. For the FH IDLE SEARCH/ RECEIVE mode, the baseband processor 430 of FIG. 1 tunes the RF receiver to a selected frequency. The baseband processor 430 also configures Black I/O 450 to provide demodulated samples at a predetermined frequency of 80 KS/sec and received by the initial FH pre-detection search module 10 shown in FIG. 2. Module 10 performs an initial FH pre-detection search to provide an initial determination of whether or not a phasing signal (i.e. information) is present in the noisy transmission medium. Correlated energy levels exceeding a threshold result in information signal "detections" or "hits" and invoke the FH post-detection processing module 11. FH post-detection module 11 provides a more refined detection test than the initial FH pre-detection module 10. During FH post-detection processing, signals are correlated and compared to a post-detection energy threshold. If the largest correlation result does not exceed the energy threshold, then post-detection processing either continues with the next sample or terminates and transfers control to the FH initial pre-detection module for resuming the pre-detection search. A post-detection "hit" or detection occurs when the post-detection energy threshold is exceeded and causes radio 100 to transition from FH IDLE SEARCH/RECEIVE into tracking modes 12 and 13 for tracking the acquired signal.

Figure 3A:
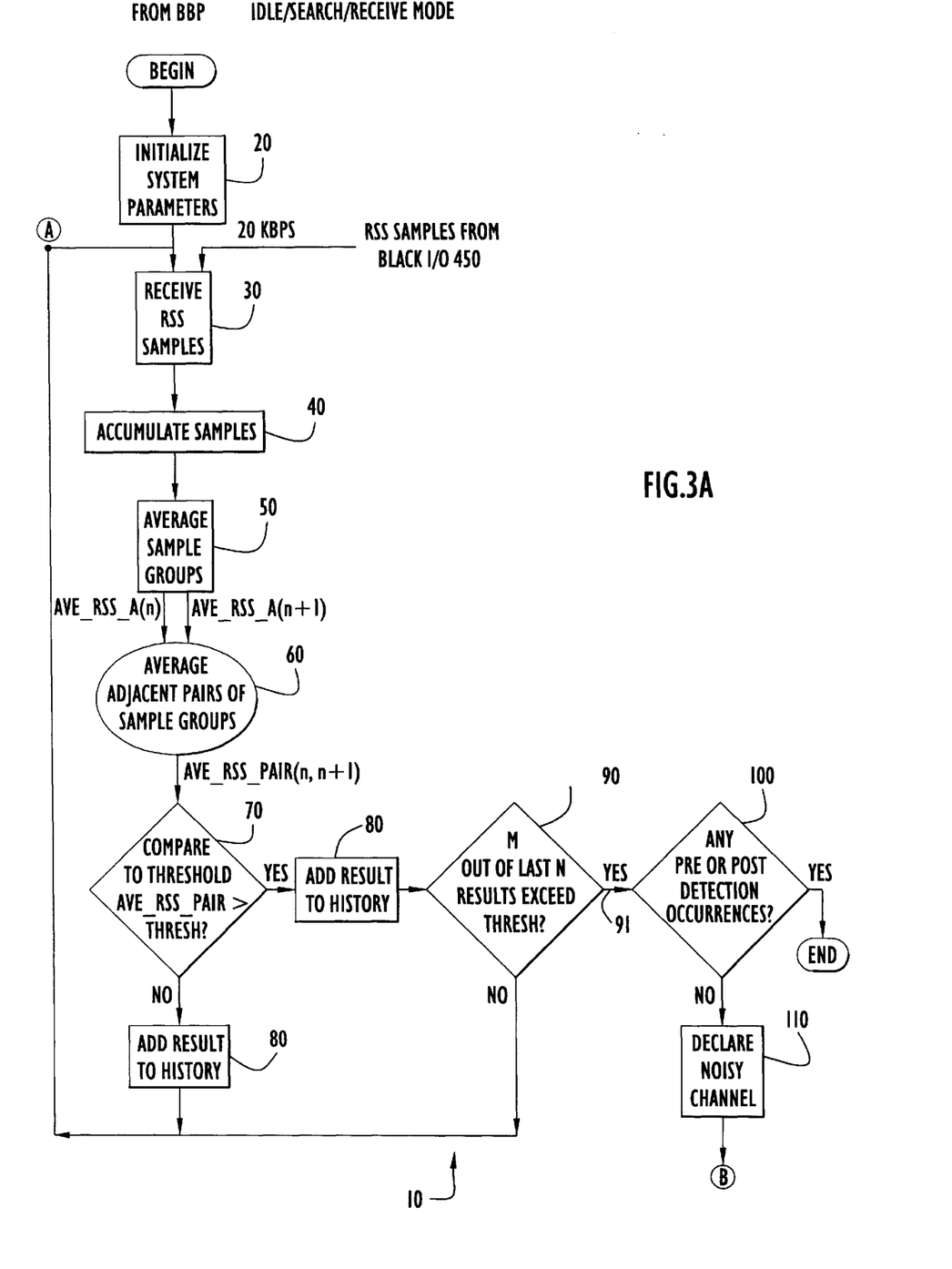
FIGS. 3A and 3B depict a flowchart of the noisy channel avoidance process.
Figure 3B:
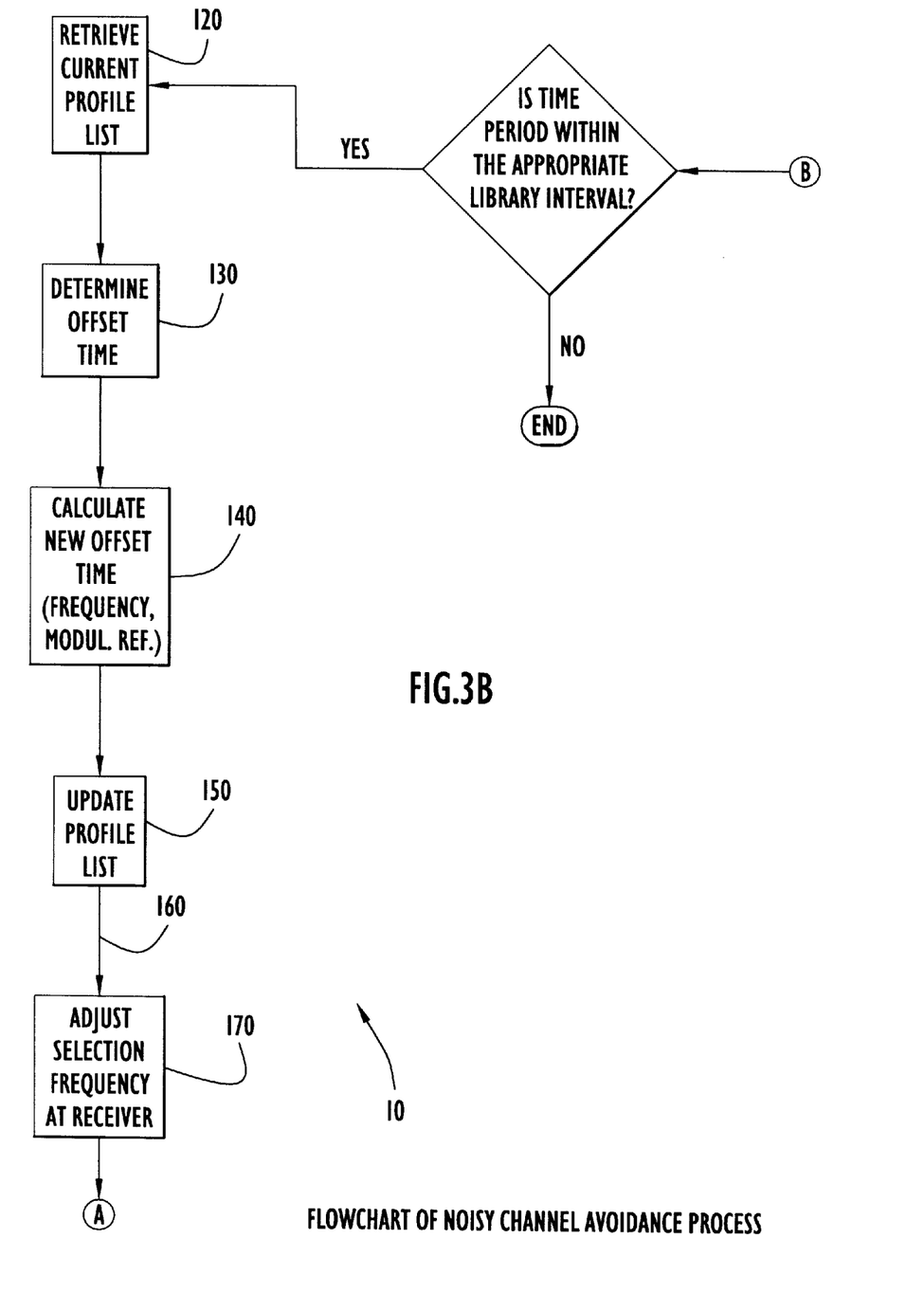
Figure 4A:
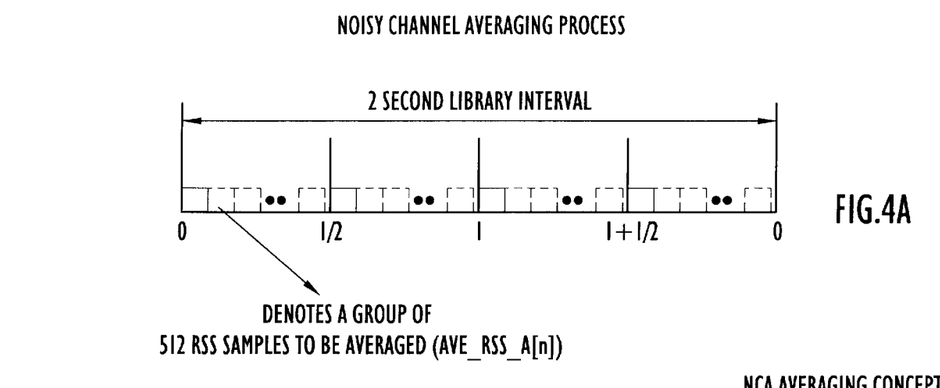
FIGS. 4A–B is a diagram showing the sample averaging concept of the noisy channel avoidance process.
Figure 4B:
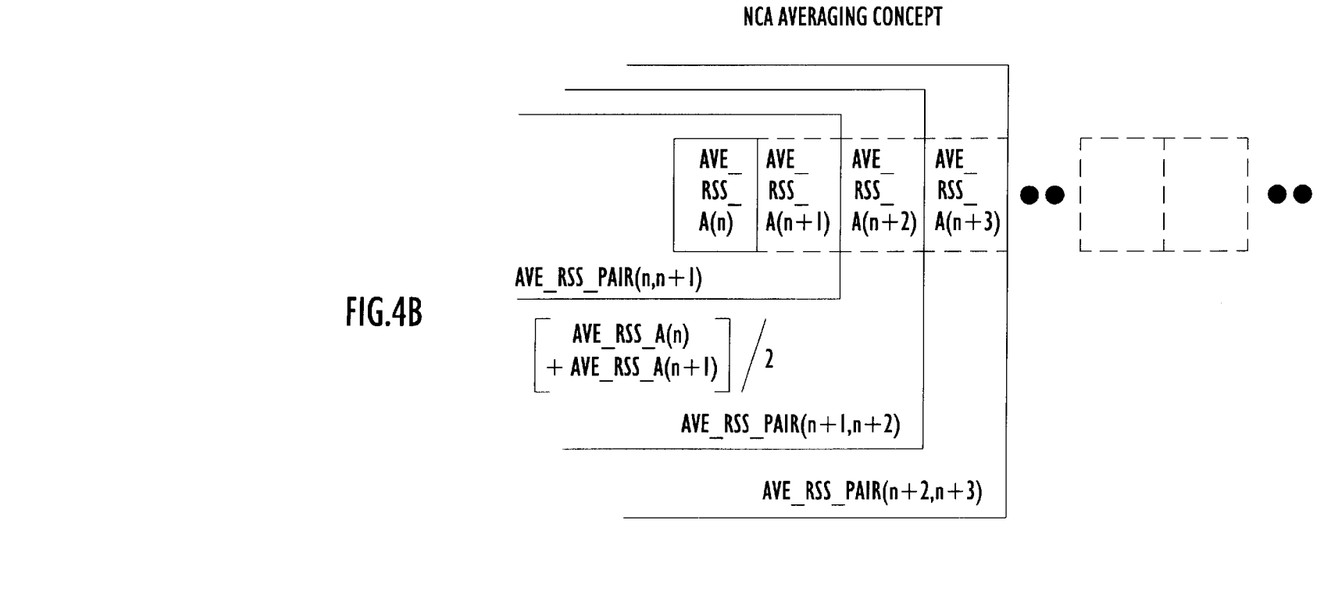

Referring now to FIGS. 3A and 3B, a flow chart depicting an embodiment of the NCA of the present invention is shown. The inventive noisy channel avoidance (NCA) process is initiated when the radio is conditioned to the IDLE SEARCH/RECEIVE state to search for and receive a transmitter signal. System parameters including the noise threshold value, the mode of operation (SDM or EDM), library period (In-Net or Late Net), and the exceed ratio (the number of times the noise threshold must be exceeded relative to the number of average pair comparisons before a noisy channel is declared) are initialized in Block 20. Upon initialization of NCA 10, determination of a noisy receive/search channel is made using processed measurements of the received signal strength (RSS) indicator generated by Black I/O circuitry 450 and input to NCA 20 as shown in block 30. The RSS represents the relative power of the demodulated noise signal samples from RF 300 absent information signals on the particular frequency channel to which the receiver is tuned. In the preferred embodiment, 12 bit RSS samples are supplied from an A/D converter (not shown) in Black I/O 450 at a frequency hopping RF bit rate of 20 kbps and right justified leaving four spare bits (all zeros) at the most significant nibble. Groups of 512 RSS samples are accumulated as shown in block 40. Each group of 512 RSS samples is then averaged as shown in block 50 to obtain an RSS sample average AVE_RSS_A[n] where n is the particular sample group average. Pairs of adjacent RSS sample averages AVE_RSS_A[n], AVE_RSS_A[n+1] are input to block 60 and averaged together to produce average RSS pair values denoted as AVE_RSS_PAIR[n,n+1]. This continuous accumulation and averaging process is illustrated in FIGS. 4A and 4B for a 2 second interval indicative of In-Net Library period. Each average RSS pair value AVE_RSS_PAIR[n,n+1] is then compared with a programmable threshold value shown in block 70 to determine if the RSS pair value exceeds the threshold. The result of the comparison is added to the history of N previous threshold tests as shown in block 80. If during the time interval for the particular library period (i.e. In-Net or Late Net), M of the previous N AVE_RSS_PAIR values exceeded the programmable threshold value, shown in Block 90 line 91, then the noisy channel determination process 20 accesses memory locations to determine if any FH pre or post-detection determinations of an information signal have been made (block 100). In the preferred embodiment, both M and N values are programmable and default to M=3, N=3. If no FH pre- or post-detection processes are scheduled to be performed, then the particular frequency channel is declared noisy (block 110). If, however, an FH pre- or post detection determination is made, then the NCA process is disabled (terminated) and the radio transitions into "reception mode" for receiving or acquiring a data signal. In the preferred embodiment, a threshold voltage of 0.298 volts is used to determine whether the channel is declared a noisy channel.

Upon determining the current frequency channel to be noisy, the library period containing a profile list of time unit offsets, frequency channels, and modulation codes for the current library period is retrieved from memory (block 120). The current offset time position is determined (block 130) and, based on the current offset position and associated sequence of "next nearest library channel", a new offset time is calculated and the frequency channel and modulation code associated with that new offset are determined as shown in block 140. The offset time position, library channel, and associated modulation code are then updated in memory and used as the new current reference position, shown in block 150. Based on the new frequency selected, a signal 160 is sent to block 170 to notify BBP 440 to tune the radio RF subsystem 300 (shown in FIG. 1) to the new reception frequency. After adjusting the RF to the new frequency, RSS samples obtained at the new frequency channel are received and processed in block 30 as previously described to determine whether this particular channel is noisy. As shown in FIG. 5, the sequence of "next nearest library channel" for In-Net library period frequencies are those associated with offsets: 0, −2, +2, −4, +4, +6, −6. If +6 is reached within the period of the In-Net library period, the NCA process cycles back to offset 0 and repeats the sequence. At the conclusion of each library period (i.e. 2 sec for In-Net), radio 100 is tuned to the frequency and modulation code associated with the zero offset position and memory contents are updated accordingly. For example, when radio 100 is in In-Net IDLE SEARCH/RECEIVE mode, the frequency channel associated with offset position 0 is selected and sampled to determine if that channel is noisy. If the channel is deemed noisy and no signal pre- or post-detections are present, then the frequency associated with offset −2 is selected. If that channel is deemed noisy, then the frequency associated with offset +2 is selected. The determination process proceeds in this manner, cycling through the remainder of the predetermined sequence {−4, +4, +6, −6} and back to 0 until a non-noisy channel is found or the current two second library interval expires.

Figure 6:
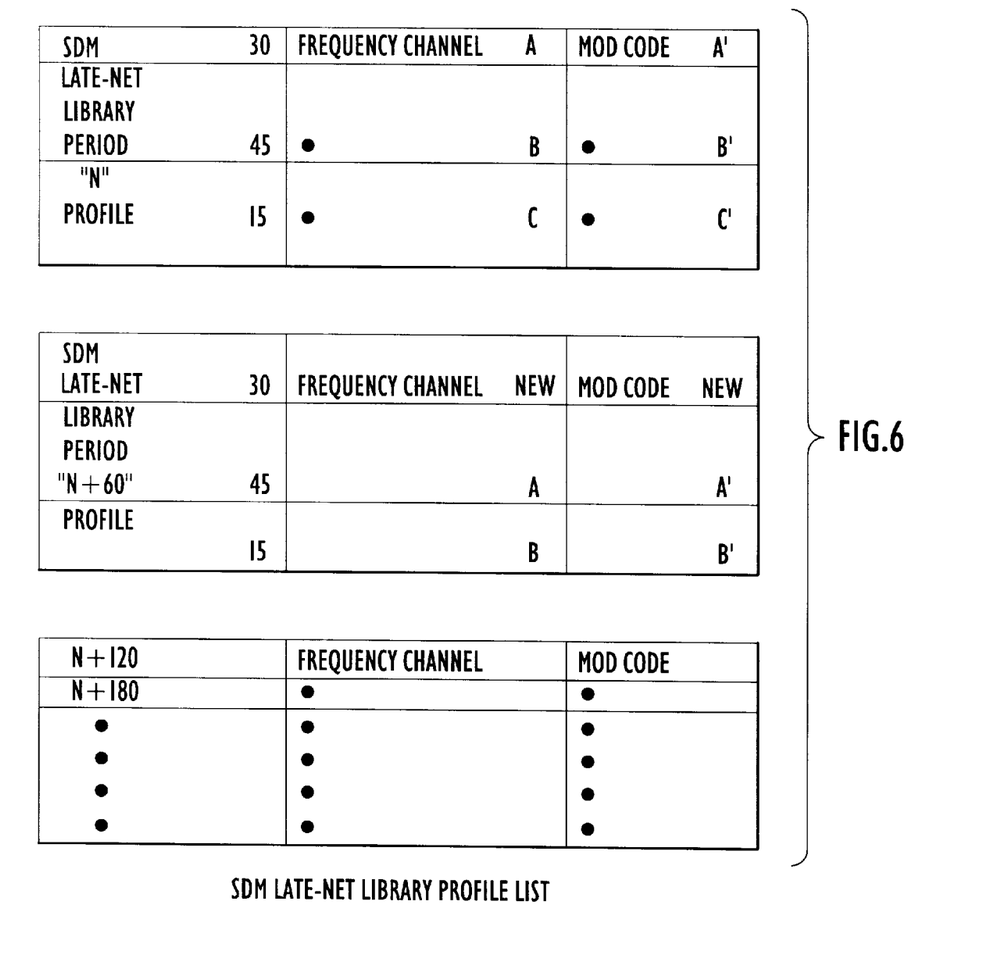
FIG. 6 is a diagram of an SDM Late-Net Library Profile List.

FIG. 6 shows the preferred embodiment of the SDM Late-Net sequence of "next nearest library channels". The period of the SDM Late-Net library interval is preferably 60 sec. As described above, when a receiver is in SDM Late-Net entry mode of operation and a noisy channel event is declared within the period of the SDM Late-Net library interval (60 sec) as in block 105 of FIG. 3, the radio is retuned to the next nearest SDM Late-Net library channel with the associated modulation code used as the new reference. The sequence of "next nearest library channel" for SDM Late-Net library period frequencies are those associated with offsets: {30 (no offset), 45, 15}. If 15 is reached within the period of the SDM Late-Net library period, the NCA process cycles back to offset 30 and repeats the sequence. At the conclusion of each SDM Late-Net library period (i.e. 60 sec), radio 100 is tuned to the frequency and modulation code associated with the 30 offset position and memory contents are updated accordingly.

Figure 7:
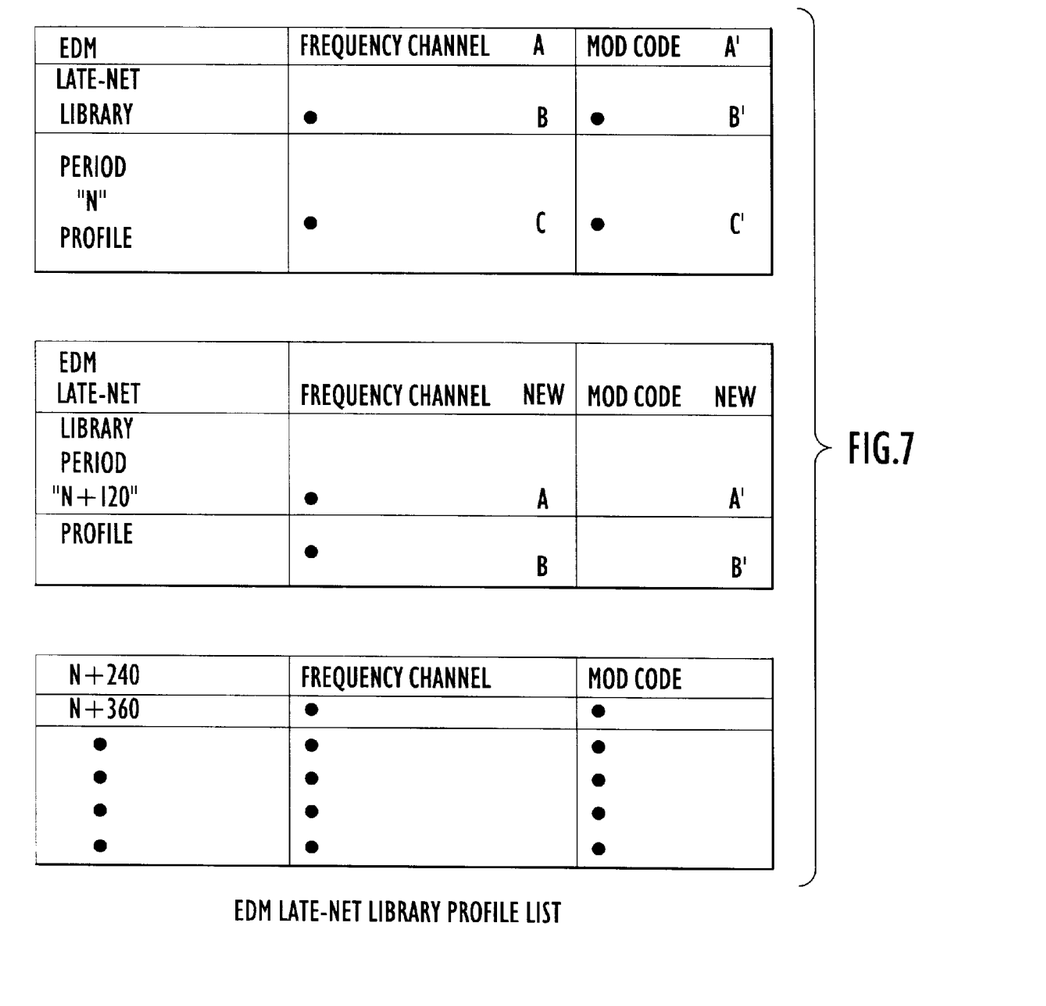
FIG. 7 is a diagram of an EDM Late-Net Library Profile List.

FIG. 7 shows the preferred embodiment of the EDM Late-Net sequence of "next nearest library channels". The period of the EDM Late-Net library interval is preferably 120 sec. As described above, when a receiver is in EDM Late-Net entry mode of operation and a noisy channel event is declared within the period of the EDM Late-Net library interval (120 sec) as in block 105 of FIG. 3, the radio is retuned to the next nearest EDM Late-Net library channel with the associated modulation code used as the new reference. The sequence of "next nearest library channel" for EDM Late-Net library period frequencies are those associated with offsets: {60 (no offset), 120, 0}. If 0 is reached within the period of the SDM Late-Net library period, the NCA process cycles back to offset 60 and repeats the sequence. At the conclusion of each EDM Late-Net library period (i.e. 120 sec), radio 100 is tuned to the frequency and modulation code associated with the 60 offset position and memory contents are updated accordingly.

In the preferred embodiment, the noisy channel avoidance process is implemented in software within the baseband digital signal processor. While there has been shown and described the preferred embodiments of the invention, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a frequency hopping digital communication network having a multimode radio transmitter for transmitting a data signal and a multimode radio receiver tuned for receiving the same, said multimode transmitter and receiver operable in a first standard mode and a second enhanced mode, each said mode having a late-net acquisition library period and an in-net acquisition library period, a method for obtaining a non-noisy frequency channel over which to receive said data signal transmitted across said radio network, said method comprising the steps of:

successively averaging signal samples received over a particular frequency channel and time interval corresponding to said receiver mode and library period to determine the noise level of said particular reception frequency channel;

comparing said averaged signal samples to a predetermined noise threshold to determine whether said frequency channel is noisy;

tuning said receiver to a new reception frequency channel, said new frequency channel selectable from a group of permissible frequency channels responsive to said receiver mode and library period and in a predetermined sequence, when said noise threshold is exceeded;

repeating the above steps until said noise threshold is not exceeded.

2. The method according to claim 1, further including the steps of:

determining the mode and library period of said radio receiver;

determining said noise threshold;

initiating the start of a predetermined library time interval corresponding to a library profile having an offset time sequence, modulation code references, and offset times corresponding to said frequency channels and responsive to said receiver mode and library period.

3. The method according to claim 2, wherein the step of determining said noise threshold includes:

determining a first noise threshold value;
    determining an exceed ratio responsive to said first noise threshold, for providing an indication of the number of times said first noise threshold is exceeded to the number of said comparisons performed, wherein said noise threshold is exceeded when said ratio exceeds a predetermined value.

4. The method according to claim 3, wherein the step of successively averaging signal samples received over a particular frequency channel further includes the steps of:

receiving said signal samples;
    accumulating said received samples in groups of 512;
    averaging each of said groups of said 512 samples to obtain a sample group average for each said group;
    averaging adjacent pairs of sample group averages to produce average pair values.

5. The method according to claim 4, wherein the step of comparing said averaged signal samples to a predetermined noise threshold further includes the steps of:

comparing each said average pair value to said first noise threshold;
    adding the results of said average pair value comparison to a history of prior comparisons;
    comparing said history of M of the previous N comparison results to said exceed ratio to determine if said noise threshold is exceeded.

6. The method according to claim 5, wherein the step of comparing said averaged signal samples to a predetermined noise threshold further includes the steps of:

determining whether any pre- or post-detection occurrences of an information signal have been detected;
    declaring said frequency channel noisy when said comparison history exceeds said exceed ratio and no pre- or post-detection occurrences have been detected.

7. The method according to claim 6, wherein the step of retuning said receiver to a new reception frequency channel further includes the step of comparing the current time to said start time of said predetermined library time interval to determine if said current library profile is still active.

8. The method according to claim 7, wherein the step of retuning said receiver to a new reception frequency channel further includes the steps of:

retrieving said current library profile when said profile is active;
    determining the current offset time and offset time sequence from said library profile;
    calculating a new offset time responsive to said current offset time and said offset time sequence;
    determining a new frequency channel and modulation code responsive to said new offset time.

9. The method according to claim 8, wherein the step of retuning said receiver to a new reception frequency channel further includes the steps of:

updating said library profile to reflect said new offset time, frequency channel and modulation code; and
    adjusting said receiver to said new frequency corresponding to said new frequency channel selected in order to receive said data signal.

10. The method according to claim 3, wherein said first noise threshold value is 0.298 volts.

11. The method according to claim 9, wherein
    for said receiver operable in said enhanced data mode and said in-net library period:
        said time offset sequence comprises {0, −2, −4, +4, +6, −6} said time offset units; and
        said library time interval is two seconds;
    for said receiver operable in said standard data mode and said late-net library period:
        said time offset sequence comprises {30, 45, 15} said time offset units; and
        said library time interval is sixty seconds;

for said receiver operable in said enhanced data mode and said late-net library period:
said time offset sequence comprises {60, 120, 0} said time offset units; and
said library time interval is one hundred twenty seconds.

12. An apparatus usable in a frequency hopping digital communication network for obtaining a non-noisy frequency channel over which to receive a data signal transmitted across said radio network, said network including a multimode radio transmitter for transmitting said data signal and a multimode radio receiver tuned for receiving the same, said multimode transmitter and receiver operable in a first standard mode and a second enhanced mode, each said mode having a late-net acquisition library period and an in-net acquisition library period, said apparatus comprising:
averaging means for receiving and successively averaging signal samples over a particular frequency channel and time interval corresponding to said receiver mode and library period to determine the noise level of said particular reception frequency channel;
compare means for comparing said averaged signal samples to a predetermined noise threshold to determine whether said frequency channel is noisy;
tuning means responsive to said compare means for repeatedly adjusting said receiver to a new reception frequency channel when said noise threshold is exceeded, wherein said new frequency channel is selectable from a group of permissible frequency channels responsive to said receiver mode and library period and according to a predetermined sequence.

13. The apparatus of claim 12, wherein said predetermined noise threshold includes a first noise threshold value and an exceed ratio indicative of the ratio of the number of times said first noise threshold may be exceeded to the number of said comparisons made before said frequency channel is declared noisy.

14. The apparatus of claim 13, further including:
means for determining said receiver mode and library period;
start means for initiating the start of a predetermined library time interval corresponding to a library profile having an offset time sequence, modulation code references, and offset times corresponding to said frequency channels and responsive to said receiver mode and library period.

15. The apparatus of claim 14, wherein said averaging means includes:
grouping means for accumulating said received samples in groups of 512;
group average means responsive to said grouping means to provide sample group averages for each said group;
pair averaging means responsive to said group averaging means for averaging adjacent pairs of sample group averages to produce average pair values.

16. The apparatus of claim 15, wherein said comparison means includes:
means for comparing each said average pair value to said first noise threshold to produce a first signal indicative of the result of said comparison;
history means responsive to said first signal for adding said result of said average pair value comparison to a history of prior comparisons;
noise means responsive to said history means for comparing said history of M of the previous N comparison results to said exceed ratio to provide a second signal indicative of whether said noise threshold is exceeded;
detection means responsive said second signal for determining whether any pre- or post-detection occurrences of an information signal have been detected and to provide a third signal indicating said frequency channel is noisy when no pre- or post-detection occurrences have been detected.

17. The apparatus of claim 16, wherein said tuning means includes:
period means for comparing the current time to said start time of said predetermined library time interval to determine if said current library profile is still active.

18. The method according to claim 17, wherein said tuning means further includes:
profile means responsive to said third signal and to said period means to retrieve said current library profile when said profile is active;
means responsive to said profile means for determining the current offset time and offset time sequence from said library profile;
offset means for calculating a new offset time responsive to said current offset time and said offset time sequence;
frequency means for determining a new frequency channel and modulation code responsive to said new offset time;
update means responsive to said offset means and to said frequency means to update said library profile to reflect said new offset time, frequency channel and modulation code;
adjusting means responsive to said frequency means for adjusting said receiver to said new frequency corresponding to said new frequency channel selected in order to receive said data signal.

19. The apparatus of claim 13, wherein said first noise threshold value is 0.298 volts.

20. The apparatus of claim 19, wherein
for said receiver operable in said enhanced data mode and said in-net library period:
said time offset sequence comprises {0, −2, −4, +4, +6, −6} said time offset units; and
said library time interval is two seconds;
for said receiver operable in said standard data mode and said late-net library period:
said time offset sequence comprises {30, 45, 15} said time offset units; and
said library time interval is sixty seconds;
for said receiver operable in said enhanced data mode and said late-net library period:
said time offset sequence comprises {60, 120, 0} said time offset units; and
said library time interval is one hundred twenty seconds.

21. In a frequency hopping communication system having a radio transmitter for transmitting a frequency-hopped signal over plural frequency channels and a receiver for receiving the signal, a method of identifying a non-noisy frequency channel, among the plural frequency channels, over which to acquire the signal at the receiver, the method comprising the steps of:
(a) prior to transmission of the signal, tuning the receiver to a selected one of the plural frequency channels;
(b) estimating a noise level of the selected frequency channel in the absence of the signal;
(c) comparing the estimated noise level to a predetermined noise threshold to determine whether the selected frequency channel is noisy;

(d) if the selected frequency channel is determined to be noisy, changing the selected frequency channel by tuning the receiver to another of the plural frequency channels and repeating steps (b) and (c); and (e) acquiring the signal on a frequency channel to which the receiver is tuned in accordance with steps (a) through (d).

22. The method of claim 21, wherein step (b) includes estimating the noise level of the selected channel by averaging the received signal strength of a set of signal samples received over the selected frequency channel during a predetermined time period.

23. The method of claim 22, wherein step (c) includes comparing the predetermined noise threshold to an average of the received signal strength of two successive sets of signal samples.

24. The method of claim 21, wherein step (c) includes identifying the selected frequency channel as a noisy channel if the estimated noise level exceeds the predetermined noise threshold M times in N comparisons, wherein M and N are positive integers.

25. The method claim 24, wherein M and N have a value of one.

26. The method of claim 21, wherein performance of steps (a) through (d) is terminated once the signal is acquired.

27. The method of claim 21, wherein the transmitter and receiver employ a library profile list of frequency channels that are used to transmit the frequency-hopped signal during a predetermined library period and, after signal acquisition, to receive the frequency-hopped signal during the predetermined library period, each of the frequency channels in the library profile list being associated with a predetermined time offset between the transmitter and receiver, the library profile list of frequency channels varying for successive library periods, and wherein, for each library period:

step (a) includes tuning the receiver to a selected one of the frequency channels in the library profile list for the library period; and step (d) includes changing the selected frequency channel by tuning the receiver to another of the frequency channels in the library profile list for the library period and repeating steps (b) and (c), if the selected frequency channel is determined to be noisy.

28. The method of claim 27, wherein, for each library period:

step (a) includes initially tuning the receiver to a frequency channel associated with a zero time offset in the library profile list; and step (d) includes tuning the receiver to frequency channels associated with successively greater time offsets in the library profile list, if successively selected frequency channels are determined to be noisy.

29. The method of claim 27, wherein step (e) includes resolving a time offset between the transmitter and receiver based on an acquisition time of the signal over the selected frequency channel and the predetermined time offset associated with the selected frequency channel, the method further comprising the step of:

(f) after step (e), frequency hopping the receiver in accordance with the library profile list to receive the signal.

30. The method of claim 27, further comprising the step of:

(f) setting a signal acquisition mode to one of a plurality of signal acquisition modes, the signal acquisition mode defining the predetermined library period, the predetermined noise threshold, and parameters of the library profile list, including time offsets and frequency channels.

31. A frequency hopping communication system, comprising:

a radio transmitter for transmitting a frequency-hopped signal over plural frequency channels; and a receiver for receiving the signal;

prior to acquisition of the signal, said receiver identifying a non-noisy frequency channel among the plural frequency channels over which to acquire the signal by: tuning to a selected one of the plural frequency channels; estimating a noise level of the selected frequency channel in the absence of the signal; comparing the estimated noise level to a predetermined noise threshold to determine whether the selected frequency channel is noisy; and, if the selected frequency channel is determined to be noisy, changing the selected frequency channel by successively tuning the receiver to others of the plural frequency channels until the estimated noise level of the selected frequency channel does not exceed the predetermined noise threshold.

32. The system of claim 31, wherein said receiver estimates the noise level of the selected channel by averaging the received signal strength of a set of signal samples received over the selected frequency channel during a predetermined time period.

33. The system of claim 32, wherein said receiver compares the predetermined noise threshold to an average of the received signal strength of two successive sets of signal samples.

34. The system claim 31, wherein said receiver identifies the selected frequency channel as a noisy channel if the estimated noise level exceeds the predetermined noise threshold M times in N comparisons, wherein M and N are positive integers.

35. The system claim 34, wherein M and N have a value of one.

36. The system of claim 31, wherein said receiver no longer attempts to identify a non-noisy frequency channel once the signal is acquired by said receiver.

37. The system of claim 31, wherein the transmitter and receiver employ a library profile list of frequency channels that are used to transmit the frequency-hopped signal during a predetermined library period and, after signal acquisition, to receive the frequency-hopped signal during the predetermined library period, each of the frequency channels in the library profile list being associated with a predetermined time offset between said transmitter and said receiver, the library profile list of frequency channels varying for successive library periods, and wherein, for each library period:

said receiver tunes to a selected one of the frequency channels in the library profile list for the library period, and changes the selected frequency channel upon detection of a noisy channel by successively tuning to other frequency channels in the library profile list for the library period until a non-noisy channel is identified.

38. The system of claim 37, wherein, for each library period:

said receiver initially tunes to a frequency channel associated with a zero time offset in the library profile list, and upon detection of a noisy channel successively tunes to frequency channels associated with successively greater time offsets in the library profile list.

39. The system of claim 37, wherein, upon acquisition of the signal, said receiver resolves a time offset between said transmitter and said receiver based on an acquisition time of the signal over the selected frequency channel and the predetermined time offset associated with the selected frequency channel, said receiver subsequently frequency hopping in accordance with the library profile list to receive the signal.

40. The system of claim 37, wherein said receiver is set in one of a plurality of signal acquisition modes, the signal acquisition mode defining the predetermined library period, the predetermined noise threshold, and parameters of the library profile list, including time offsets and frequency channels.

41. The system of claim 31, wherein the frequency-hopped signal is a synchronization signal.

* * * * *